United States Patent
Zhang et al.

(10) Patent No.: US 9,983,941 B2
(45) Date of Patent: May 29, 2018

(54) METHOD AND APPARATUS FOR RECOVERING DATA

(71) Applicant: Huawei Technologies Co., Ltd., Shenzhen (CN)

(72) Inventors: Feng Zhang, Shenzhen (CN); Fengtao Teng, Langfang (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 587 days.

(21) Appl. No.: 14/639,657

(22) Filed: Mar. 5, 2015

(65) Prior Publication Data

US 2015/0178170 A1    Jun. 25, 2015

Related U.S. Application Data

(63) Continuation of application No. PCT/CN2012/084961, filed on Nov. 21, 2012.

(51) Int. Cl.
| | | |
|---|---|---|
| G06F 11/14 | (2006.01) | |
| G06F 17/30 | (2006.01) | |
| G06F 11/20 | (2006.01) | |

(52) U.S. Cl.
CPC ...... G06F 11/1451 (2013.01); G06F 11/1435 (2013.01); G06F 11/1448 (2013.01);
(Continued)

(58) Field of Classification Search
CPC ............ G06F 11/1451; G06F 11/1448; G06F 11/1435; G06F 17/30073; G06F 11/2058; G06F 17/30194; G06F 2201/84
(Continued)

(56) References Cited

U.S. PATENT DOCUMENTS

| | | |
|---|---|---|
| 7,237,141 B2 | 6/2007 | Fredin |
| 7,281,188 B1 | 10/2007 | Bonwick et al. |

(Continued)

FOREIGN PATENT DOCUMENTS

| | | |
|---|---|---|
| CN | 101201768 A | 6/2008 |
| CN | 102279777 A | 12/2011 |

(Continued)

OTHER PUBLICATIONS

Foreign Communication From a Counterpart Application, Australian Application No. 2012395331, Australian Office Action dated May 26, 2016, 6 pages.

(Continued)

*Primary Examiner* — Jasmine Song
(74) *Attorney, Agent, or Firm* — Conley Rose, P.C.

(57) ABSTRACT

In a data recovery method, there are a server and a plurality of storage devices each storing a copy of a data block. The server divides each copy of the data block into N segments corresponding to a sequence of N partitions. And then, the server constructs a plurality of different trial data blocks each including N segments corresponding to the sequence of N partitions. After that, the server calculates a check code for each trial data block, and continues to identify a trial data block having a check code identical to a pre-stored standard check code of the data block. At last, the server replaces at least one of the copies of the data block with the identified trial data block having the check code identical to the pre-stored standard check code.

9 Claims, 14 Drawing Sheets

(52) U.S. Cl.
CPC .... *G06F 11/2058* (2013.01); *G06F 17/30073* (2013.01); *G06F 17/30194* (2013.01); *G06F 2201/84* (2013.01)

(58) Field of Classification Search
USPC .......................................................... 711/162
See application file for complete search history.

(56) References Cited

U.S. PATENT DOCUMENTS

| | | | |
|---|---|---|---|
| 7,689,877 B2 * | 3/2010 | Moore ................ | G06F 11/1076 714/710 |
| 2010/0325500 A1 | 12/2010 | Bashir et al. | |
| 2011/0296104 A1 | 12/2011 | Noda et al. | |

FOREIGN PATENT DOCUMENTS

| | | |
|---|---|---|
| CN | 102308273 A | 1/2012 |
| CN | 102368222 A | 3/2012 |

OTHER PUBLICATIONS

Foreign Communication From a Counterpart Application, PCT Application No. PCT/CN2012/084961, English Translation of International Search Report dated Aug. 22, 2013, 2 pages.
Foreign Communication From a Counterpart Application, PCT Application No. PCT/CN2012/084961, English Translation of Written Opinion dated Aug. 22, 2013, 5 pages.

* cited by examiner

METHOD AND APPARATUS FOR RECOVERING DATA

CROSS-REFERENCE TO RELATED APPLICATIONS

This application is a continuation of International Application No. PCT/CN2012/084961, filed on Nov. 21, 2012, which is hereby incorporated by reference in its entirety.

TECHNICAL FIELD

The present invention relates to the field of electronic information technologies, and in particular, to a method and an apparatus for recovering data.

BACKGROUND

With the development of electronic information technologies, data stored by users in a database is ever-increasing. To ensure security and stability of the data, a lot of data maintenance/recovery technologies are derived, where a multi-copy data storage technology is a common data maintenance/recovery technology.

In an existing multi-copy data storage technology, multiple same copies are generated on a basis of data, and the multiple same copies are separately stored in different databases or backup nodes. For example, data that needs to be backed up may be copied to generate three same copies, and each copy is the same as the data that needs to be backed up. The three same copies are separately stored in a node 1, a node 2 and a node 3; the node 1, the node 2 and the node 3 have been networked, and may perform data exchange. When the copy on one node is damaged, the copy is recovered using the correct copy on another node. For example, when the data on the node 3 is damaged due to a fault occurring on the node 3, the data on the node 3 is recovered using the correct data on the node 1 or node 2, which ensures that the three copies are available and enhances data reliability.

Problems in the prior art are as follows. In some cases, all copies may be damaged. For example, when the copies in the node 1, node 2 and node 3 are all damaged, the copies cannot be recovered, so that the data that is backed up is permanently damaged, and this brings losses to a user due to low security of the data that is backed up.

SUMMARY

Embodiments of the present invention provide a method and an apparatus for recovering data, which can divide data in a copy into multiple data segments, and recover the data in the copy using a data segment as a minimum unit; therefore, when damaged data exists in all copies, data that is backed up can still be recovered, thereby reducing losses of a user.

To achieve the foregoing objective, the embodiments of the present invention adopt the following technical solutions.

According to a first aspect, an embodiment of the present invention provides a method for recovering data, including backing up data that needs to be backed up, and generating at least N same copies, where each copy is formed by at least M segments, each segment includes part of content of one copy, the number of segments forming each copy is the same, N is a positive integer greater than or equal to 2, M is a positive integer greater than or equal to 1, and a manner of dividing each copy into segments is the same, that is, when all the copies are undamaged, one segment in one copy includes same content as a segment that is in another copy and located in a same position as this segment; and executing the following procedure for each segment: detecting whether segments in a same position in all the copies are damaged; and replacing a damaged segment with an undamaged segment if at least one of same segments in all the copies is undamaged.

With reference to the first aspect, in a first possible implementation manner of the first aspect, the method further includes dividing the data that needs to be backed up into at least one segment, and generating, according to a preset rule, a standard check code corresponding to each segment in the data that needs to be backed up, where each segment in the data that needs to be backed up includes part of content of the data that needs to be backed up, and a manner of dividing the data that needs to be backed up into segments is the same as the manner of dividing each copy into segments, that is, when all the copies are undamaged, one segment in the data that needs to be backed up includes same content as a segment that is in any copy and located in a same position as this segment.

With reference to the first aspect or the first possible implementation manner of the first aspect, in a second possible implementation manner, the detecting whether same segments in all the copies are damaged includes generating, according to the preset rule, check codes corresponding to segments in a first copy; detecting whether the check codes corresponding to the segments in the first copy are the same as the standard check code, where if a check code corresponding to one segment in the first copy is the same as the standard check code, this segment in the first copy is undamaged; and if a check code corresponding to one segment in the first copy is different from the standard check code, this segment in the first copy is damaged; and repeating the foregoing procedure until it is detected whether the segments in all the copies are damaged.

With reference to the first aspect, in a third possible implementation manner of the first aspect, the replacing a damaged segment with an undamaged segment includes acquiring an $i^{th}$ segment that is undamaged in one copy, and copying content included in the $i^{th}$ segment that is undamaged, where $1 \leq i \leq M$, and i is an integer; determining all $i^{th}$ segments that are damaged in other copies; sending the copied content to backup nodes on which the $i^{th}$ segments that are damaged are located; and overwriting content of the $i^{th}$ segments that are damaged on the backup nodes with the copied content.

With reference to the first aspect, in a fourth possible implementation manner of the first aspect, if the same segments in all the copies are all damaged, the method further includes acquiring a first segment set, where the first segment set includes segments in one same position in all the copies; using one segment as a target segment in the first segment set, where X sub-segments of the target segment are different from sub-segments that are of other segments in the first segment set and located in same positions as the X sub-segments, X is an integer greater than or equal to 1, one sub-segment includes at least one binary character, and a manner of dividing each segment into sub-segments is the same, that is, in the first segment set, one sub-segment of one segment includes same content as a sub-segment that is of another segment in the first segment set and located in a same position as this sub-segment; replacing an $X^{th}$ sub-segment of the target segment with a sub-segment that is of other $Y_x$ segments and located in a same position, and acquiring $Y_x+1$ replacement results, where $Y_x$ represents the number of sub-segments that are of other segments, located in the same position and different from the $X^{th}$ sub-segment of the target segment, $Y_x$ is an integer, and $1 \leq Y_x \leq N$; combining replacement results of all the X sub-segments of the target segment, and acquiring $(Y_1+1)*(Y_2+1) \ldots *(Y_x+1)-N$ segments that are of the target segment and obtained by combination; and determining an undamaged segment among the segments obtained by combination, and replacing all segments in the first segment set with the undamaged segment in the segments obtained by combination.

With reference to the fourth possible implementation manner of the first aspect, in a fifth possible implementation manner, the determining an undamaged segment among the segments obtained by combination includes generating, according to the preset rule, check codes corresponding to the segments obtained by combination; determining a target check code among the check codes corresponding to the segments obtained by combination, where the target check code is a check code that is the same as a standard check code corresponding to the target segment, and in the data that needs to be backed up, a standard check code of a segment that is located in a same position as the target segment is the standard check code corresponding to the target segment; and using a segment that is obtained by combination and corresponds to the target check code as the undamaged segment.

According to a second aspect, an embodiment of the present invention provides an apparatus for recovering data, including a backup generating module, configured to back up data that needs to be backed up, and generate at least N same copies, where each copy is formed by at least M segments, each segment includes part of content of one copy, the number of segments forming each copy is the same, N is a positive integer greater than or equal to 2, M is a positive integer greater than or equal to 1, and a manner of dividing each copy into segments is the same, that is, when all the copies are undamaged, one segment in one copy includes same content as a segment that is in another copy and located in a same position as this segment; a diagnosing module, configured to detect whether segments in a same position in all the copies are damaged; and a recovering module, configured to replace a damaged segment with an undamaged segment if at least one of same segments in all the copies is undamaged.

With reference to the second aspect, in a first possible implementation manner of the second aspect, the apparatus includes a standard check code generating module, configured to divide the data that needs to be backed up into at least one segment, and generate, according to a preset rule, a standard check code corresponding to each segment in the data that needs to be backed up, where each segment in the data that needs to be backed up includes part of content of the data that needs to be backed up, and a manner of dividing the data that needs to be backed up into segments is the same as the manner of dividing each copy into segments, that is, when all the copies are undamaged, one segment in the data that needs to be backed up includes same content as a segment that is in any copy and located in a same position as this segment.

With reference to the second aspect or the first possible implementation mode of the second aspect, in a second possible implementation mode, the apparatus includes a check code generating module, configured to generate, according to the preset rule, check codes corresponding to segments in a first copy, where the diagnosing module is further configured to detect whether the check codes corresponding to the segments in the first copy are the same as the standard check code, where if a check code corresponding to one segment in the first copy is the same as the standard check code, this segment in the first copy is undamaged, and if a check code corresponding to one segment in the first copy is different from the standard check code, this segment in the first copy is damaged; and repeat the foregoing procedure until it is detected whether the segments in all the copies are damaged.

With reference to the second aspect, in a third possible implementation manner of the second aspect, the recovering module includes an extracting unit, configured to acquire an $i^{th}$ segment that is undamaged in one copy, and copy content included in the $i^{th}$ segment that is undamaged, where $1 \leq i \leq M$, and i is an integer; a positioning unit, configured to determine all $i^{th}$ segments that are damaged in other copies; a transmitting unit, configured to send the copied content to backup nodes on which the $i^{th}$ segments that are damaged are located; and a first recovering unit, configured to overwrite content of the $i^{th}$ segments that are damaged on the backup nodes with the copied content.

With reference to the second aspect, in a fourth possible implementation manner of the second aspect, the recovering module further includes an analyzing unit, configured to acquire a first segment set, where the first segment set includes segments in one same position in all the copies, and use one segment as a target segment in the first segment set, where X sub-segments of the target segment are different from sub-segments that are of other segments in the first segment set and located in same positions as the X sub-segments, X is an integer greater than or equal to 1, one sub-segment includes at least one binary character, and a manner of dividing each segment into sub-segments is the same, that is, in the first segment set, one sub-segment of one segment includes same content as a sub-segment that is of another segment in the first segment set and located in a same position as this sub-segment; a first preprocessing unit, configured to replace an $X^{th}$ sub-segment of the target segment with a sub-segment that is of other $Y_x$ segments and located in a same position, and acquire $Y_x+1$ replacement results, where $Y_x$ represents the number of sub-segments that are of other segments, located in the same position, and different from the $X^{th}$ sub-segment of the target segment, $Y_x$ is an integer, and $1 \leq Y_x \leq N$; a second preprocessing unit, configured to combine replacement results of all the X sub-segments of the target segment and acquire $(Y_1+1)*(Y_2+1) \ldots *(Y_x+1)-N$ segments that are of the target segment and obtained by combination; and a second recovering unit, configured to determine an undamaged segment among the segments obtained by combination, and replace all segments in the first segment set with the undamaged segment in the segments obtained by combination, where the check code generating module is configured to generate, according to the preset rule, check codes corresponding to the segments obtained by combination; and the diagnosing module is further configured to determine a target check code among the check codes corresponding to the segments obtained by combination, and use a segment that is obtained by combination and corresponds to the target check code as the undamaged segment, where the target check code is a check code that is the same as a standard check code corresponding to the target segment, and in the data that needs to be backed up, a standard check code of a segment that is located in a same position as the target segment is the standard check code corresponding to the target segment.

According to a third aspect, an embodiment of the present invention provides a computing node for recovering data, including a processor, a communication interface, a memory, and a bus, where the processor, the communication interface and the memory implement mutual communication using the bus; the processor is configured to acquire, through the communication interface, a data backup that needs to be backed up, back up data that needs to be backed up, generate at least N same copies, and store the at least N same copies in the memory, where each copy is formed by at least M segments, each segment includes part of content of one copy, the number of segments forming each copy is the same, N is a positive integer greater than or equal to 2, M is a positive integer greater than or equal to 1, and a manner of dividing each copy into segments is the same, that is, when all the copies are undamaged, one segment in one copy includes same content as a segment that is in another copy and located in a same position as this segment; the processor is further configured to detect whether segments in a same position in all the copies are damaged; and the processor is further configured to, if at least one of same segments in all the copies is undamaged, acquire the undamaged segment from the memory segment, and replace a damaged segment in the memory with the undamaged segment.

With reference to the third aspect, in a first possible implementation manner of the third aspect, the processor is further configured to divide the data that needs to be backed up into at least one segment, generate, according to a preset rule, a standard check code corresponding to each segment in the data that needs to be backed up, and store the generated standard check code in the memory, where each segment in the data that needs to be backed up includes part of content of the data that needs to be backed up, and a manner of dividing the data that needs to be backed up into segments is the same as the manner of dividing each copy into segments, that is, when all the copies are undamaged, one segment in the data that needs to be backed up includes same content as a segment that is in any copy and located in a same position as this segment.

With reference to the third aspect or the first possible implementation manner of the third aspect, in a second possible implementation manner, the processor is further configured to generate, according to the preset rule, check codes corresponding to segments in a first copy; detect whether the check codes corresponding to the segments in the first copy are the same as the standard check code stored in the memory, where if a check code corresponding to one segment in the first copy is the same as the standard check code, this segment in the first copy is undamaged; and if a check code corresponding to one segment in the first copy is different from the standard check code, this segment in the first copy is damaged; and repeat the foregoing procedure until it is detected whether the segments in all the copies are damaged.

With reference to the third aspect, in a third possible implementation manner of the third aspect, the memory is formed by at least one backup node, and the processor is further configured to acquire an $i^{th}$ segment that is undamaged in one copy, and copy content included in the $i^{th}$ segment that is undamaged, where $1 \leq i \leq M$, and i is an integer; determine all $i^{th}$ segments that are damaged in other copies; send the copied content to backup nodes on which the $i^{th}$ segments that are damaged are located through the communication interface; and overwrite content of the $i^{th}$ segments that are damaged on the backup nodes with the copied content.

With reference to the third aspect, in a fourth possible implementation manner of the third aspect, the processor is further configured to acquire a first segment set if the same segments in all the copies are all damaged, where the first segment set includes segments in one same position in all the copies; use one segment as a target segment in the first segment set, where X sub-segments of the target segment are different from sub-segments that are of other segments in the first segment set and located in same positions as the X sub-segments, X is an integer greater than or equal to 1, one sub-segment includes at least one binary character, and a manner of dividing each segment into sub-segments is the same, that is, in the first segment set, one sub-segment of one segment includes same content as a sub-segment that is of another segment in the first segment set and located in a same position as this sub-segment; replace an $X^{th}$ sub-segment of the target segment with a sub-segment that is of other $Y_x$ segments and located in a same position, and acquire $Y_x+1$ replacement results, where $Y_x$ represents the number of sub-segments that are of other segments, located in the same position and different from the $X^{th}$ sub-segment of the target segment, $Y_x$ is an integer, and $1 \leq Y_x \leq N$; combine replacement results of all the X sub-segments of the target segment, and acquire $(Y_1+1)*(Y_2+1) \ldots *(Y_x+1)-N$ segments that are of the target segment and obtained by combination; and determine an undamaged segment among the segments obtained by combination, and replace all segments in the first segment set with the undamaged segment in the segments obtained by combination.

With reference to the first possible implementation manner of the third aspect or the fourth possible implementation manner of the third aspect, in a fifth possible implementation manner, the processor is further configured to generate, according to the preset rule, check codes corresponding to the segments obtained by combination, and store, in the memory, the check code corresponding to the segments obtained by combination; determine a target check code among the check codes corresponding to the segments obtained by combination, where the target check code is a check code that is the same as a standard check code corresponding to the target segment, and in the data that needs to be backed up, a standard check code of a segment that is located in a same position as the target segment is the standard check code corresponding to the target segment; and use a segment that is obtained by combination and corresponds to the target check code as the undamaged segment.

According to a fourth aspect, an embodiment of the present invention provides a computer program product for recovering data, including a computer-readable storage medium that stores program code, where an instruction included in the program code is used for backing up data that needs to be backed up, and generating at least N same copies, where each copy is formed by at least M segments, each segment includes part of content of one copy, the number of segments forming each copy is the same, N is a positive integer greater than or equal to 2, M is a positive integer greater than or equal to 1, and a manner of dividing each copy into segments is the same, that is, when all the copies are undamaged, one segment in one copy includes same content as a segment that is in another copy and located in a same position as this segment; and executing the following procedure for each segment: detecting whether segments in a same position in all the copies are damaged; and replacing a damaged segment with an undamaged segment if at least one of same segments in all the copies is undamaged.

According to the method and apparatus for recovering data provided in the embodiments of the present invention, data in a copy can be divided into multiple data segments, check codes for the data segments are compared to detect whether the data segments are damaged, and when one data segment is damaged, the damaged data segment is recovered using another undamaged data segment, thereby ensuring correctness of the data segments and further ensuring correctness of the copy. In the solutions provided in the present invention, data that is backed up can still be recovered when damaged data exists in all copies, which prevents a problem in the prior art that the copies cannot be recovered and the data that is backed up is permanently damaged when all the copies are damaged, thereby improving security of the data that is backed up and reducing losses of a user.

BRIEF DESCRIPTION OF DRAWINGS

To describe the technical solutions in the embodiments of the present invention more clearly, the following briefly introduces the accompanying drawings required for describing the embodiments.

DESCRIPTION OF EMBODIMENTS

The following clearly describes the technical solutions in the embodiments of the present invention with reference to the accompanying drawings in the embodiments of the present invention.

Figure 1A:
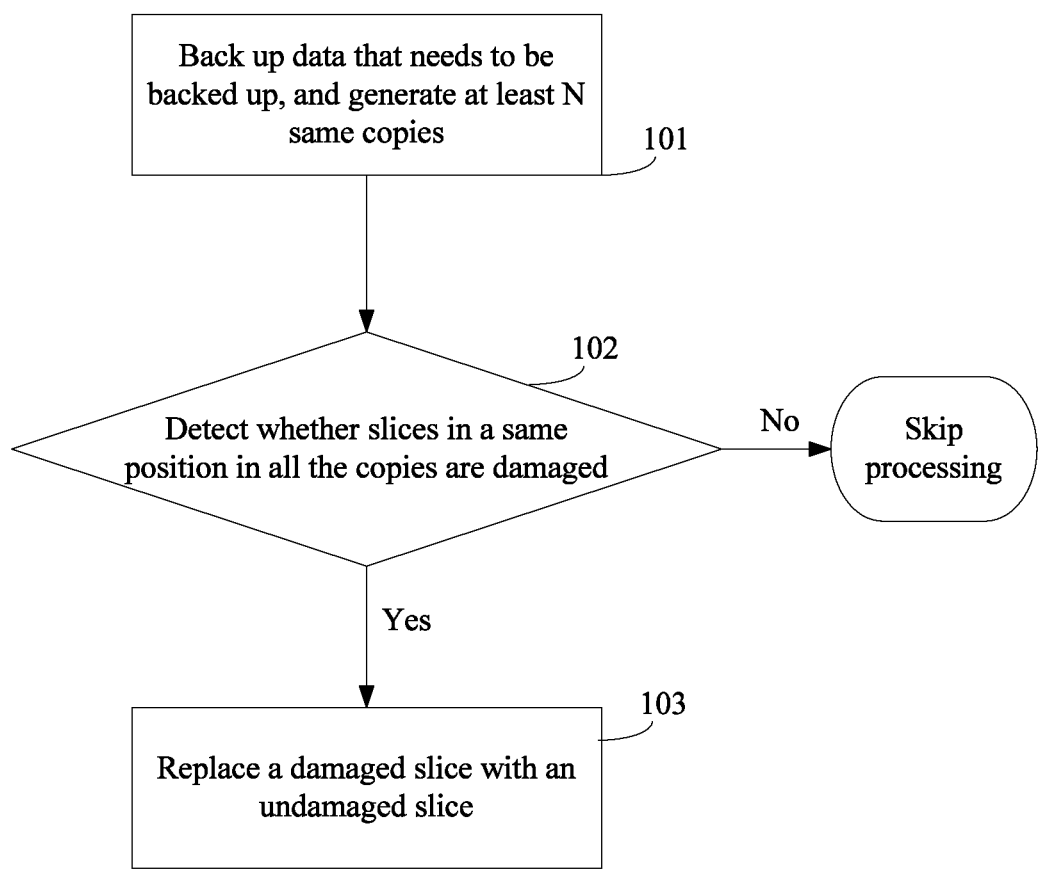
FIG. 1A is a flowchart of a method for recovering data according to an embodiment of the present invention.

According to one aspect, an embodiment of the present invention provides a method for recovering data, as shown in FIG. 1A, including the following steps.

It should be noted that, a specific implementation manner of data recovery in this embodiment may be executed by a device such as a server, for example, a management server in a common database, or may be executed by a terminal device, for example, a mobile workstation that is commonly used by a person of skill during work and is capable of accessing a database. That is, a device that is capable of performing analysis and copying processing on data and has a data transmission function can execute the specific implementation manner of the data recovery in this embodiment, which is not limited herein.

101. Back up data that needs to be backed up, and generate at least N same copies.

In this embodiment, a server may first back up the data that needs to be backed up, and generate at least two copies. When all the copies are undamaged, the first segment in a first copy includes same content as the first segment in another copy, that is, the copies that have just been generated are the same as the data that needs to be backed up. For example, the server copies a document with a size of 10 megabyte (MB) for three times to generate three copy documents, and each copy document is the same as the original document.

Further, each copy is formed by at least M segments, each segment includes part of content of one copy, the number of segments forming each copy is the same, N is a positive integer greater than or equal to 2, M is a positive integer greater than or equal to 1, and one segment in one copy includes same content as a segment that is in another copy and located in a same position as this segment. In the embodiment, the segment can also be named slice. The two terms are interchangeable.

Figure 1B:
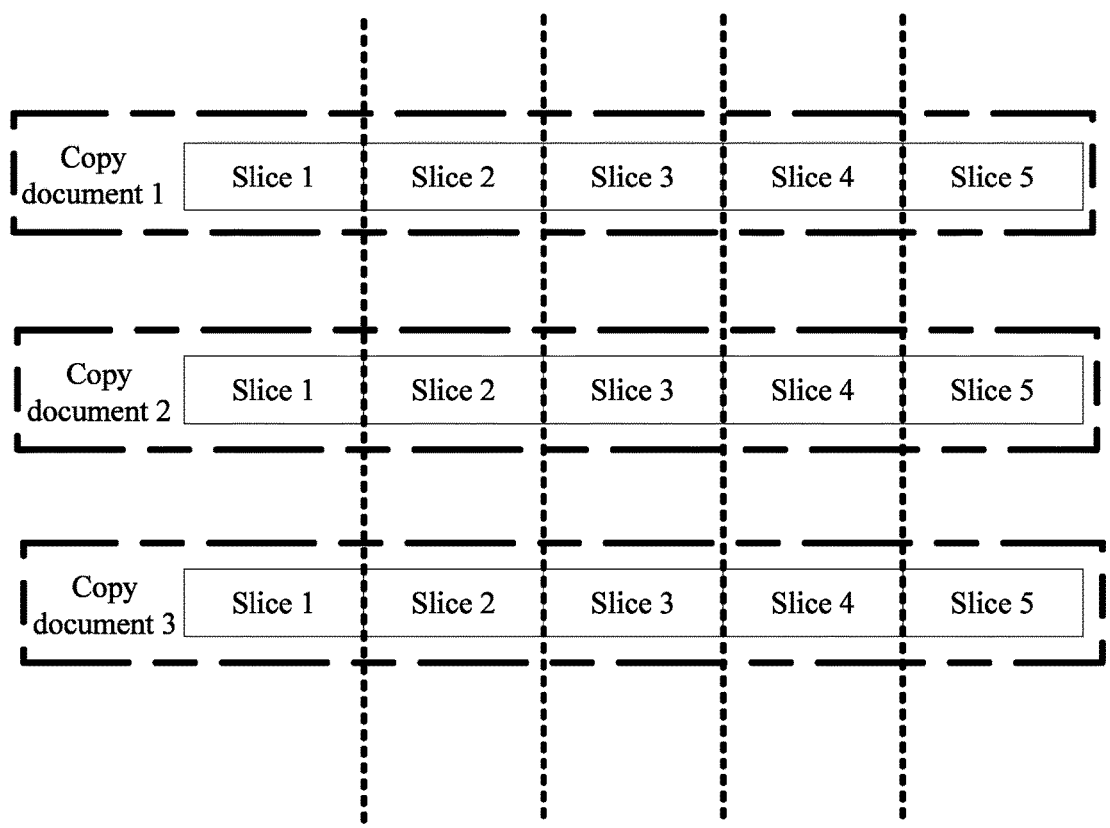
FIG. 1B is a schematic diagram of a specific example of a method for recovering data according to an embodiment of the present invention.

In this embodiment, the server may divide one copy into at least two data segments using a commonly used technical means, and use one data segment as one segment. For example, as shown in FIG. 1B, the server may divide each copy document with the size of 10 MB into five data segments, and a size of each data segment is 2 MB, that is, a size of each segment is 2 MB. The server may also divide each of the other copy documents into five segments in a same dividing manner, where a size of each segment is 2 MB. Because the copy documents that are backed up are the same and dividing manners are also the same, a segment in each copy document is also the same as a segment in a same position in the other copy documents. For example, as shown in FIG. 1B, a segment 1 in a copy document 1, a segment 1 in a copy document 2 and a segment 1 in a copy document 3 are all the same.

In this embodiment, the server may execute the following procedure of 102-103 for each segment.

102. Detect whether segments in a same position in all the copies are damaged.

For example, as shown in FIG. 1B, each of the copy document 1, the copy document 2 and the copy document 3 has the segment 1, and the segment 1 in the copy document 1, the segment 1 in the copy document 2 and the segment 1 in the copy document 3 are all the same, so that the set of segments 1 includes same segments in all the copies, and the server may detect whether any one of the segment 1 in the copy document 1, the segment 1 in the copy document 2 and the segment 1 in the copy document 3 is damaged.

103. Replace a damaged segment with an undamaged segment if at least one of same segments in all the copies is undamaged.

Figure 1C:
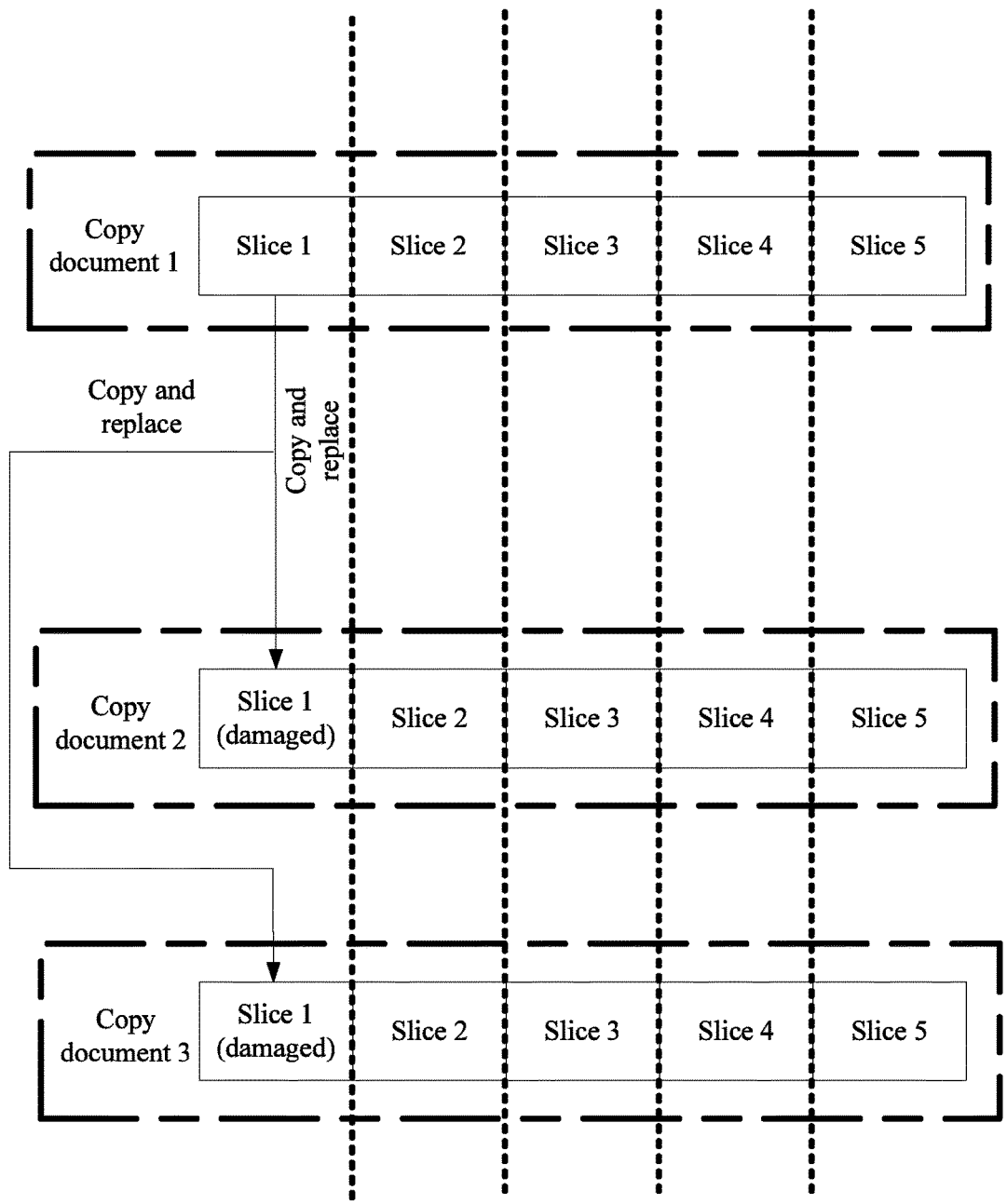
FIG. 1C is a schematic diagram of another specific example of a method for recovering data according to an embodiment of the present invention.

For example, as shown in FIG. 1C, when the server detects that the segment 1 in the copy document 1 is undamaged and both the segment 1 in the copy document 2 and the segment 1 in the copy document 3 are damaged, the server may separately copy the segment 1 in the copy document 1 to the copy document 2 and the copy document 3 to replace the segment 1 in the copy document 2 and the segment 1 in the copy document 3, so as to recover the damaged segment 1 in the copy document 2 and the damaged segment 1 in the copy document 3.

Processing is skipped if no segment in all the copies is damaged.

Figure 1D:
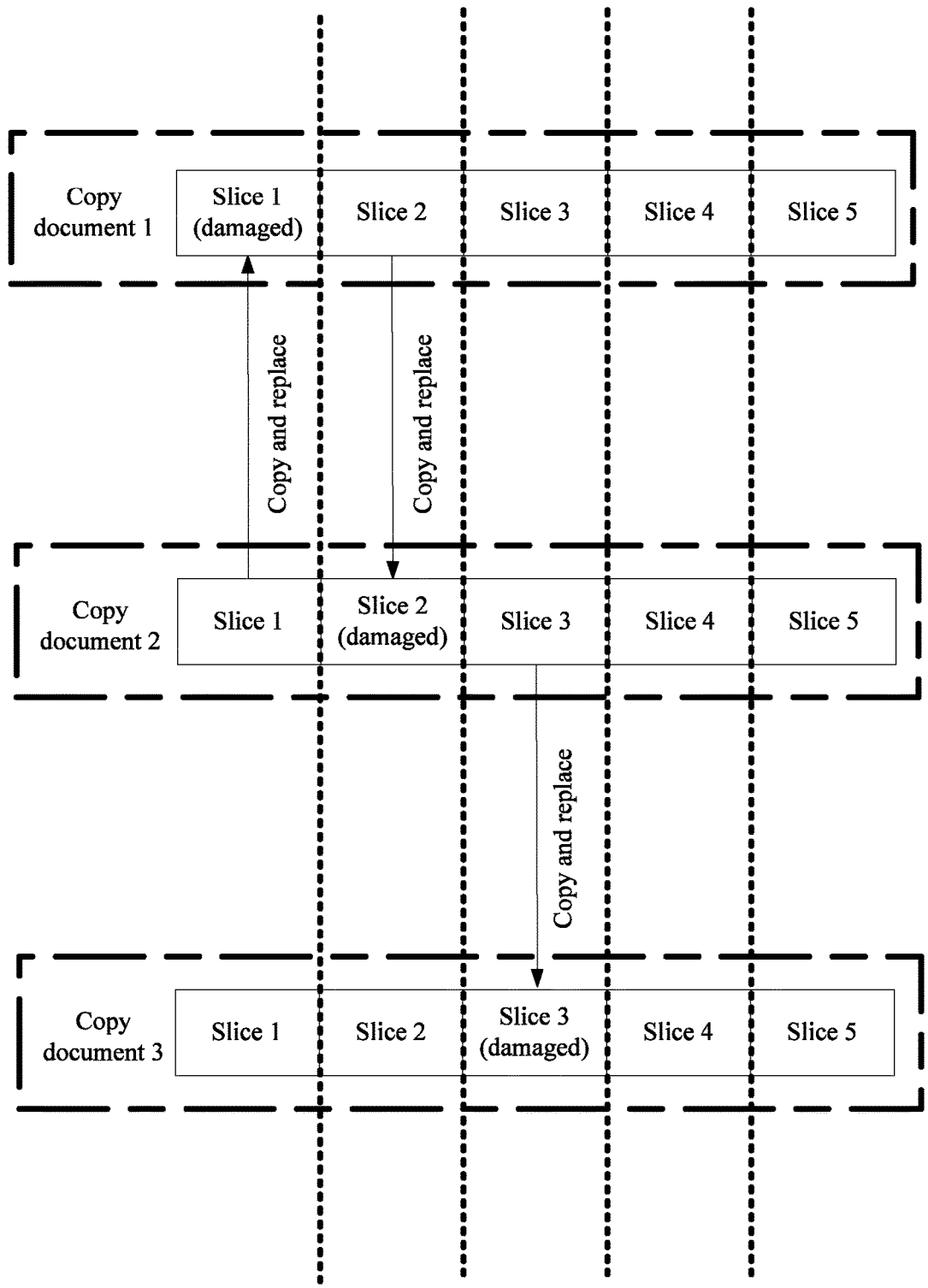
FIG. 1D is a schematic diagram of still another specific example of a method for recovering data according to an embodiment of the present invention.

According to the method for recovering data provided in this embodiment of the present invention, data in a copy can be divided into multiple data segments, and when one data segment is damaged, the damaged data segment is recovered using another undamaged data segment, thereby ensuring correctness of the data segment and further ensuring correctness of the copy. For example, as shown in FIG. 1D, if the segment 1 in the copy document 1, the segment 2 in the copy document 2 and the segment 3 in the copy document 3 are all damaged, but other segments are undamaged, that is, when damaged data exists in all the copies, a server may use an undamaged segment in one copy to recover a damaged segment in another copy, so as to recover all the copy documents. Compared with the prior art, in the solutions according to this embodiment of the present invention, data that is backed up may still be recovered when damaged data exists in all copies, thereby improving security of the data that is backed up and reducing losses of a user.

Figure 2A:
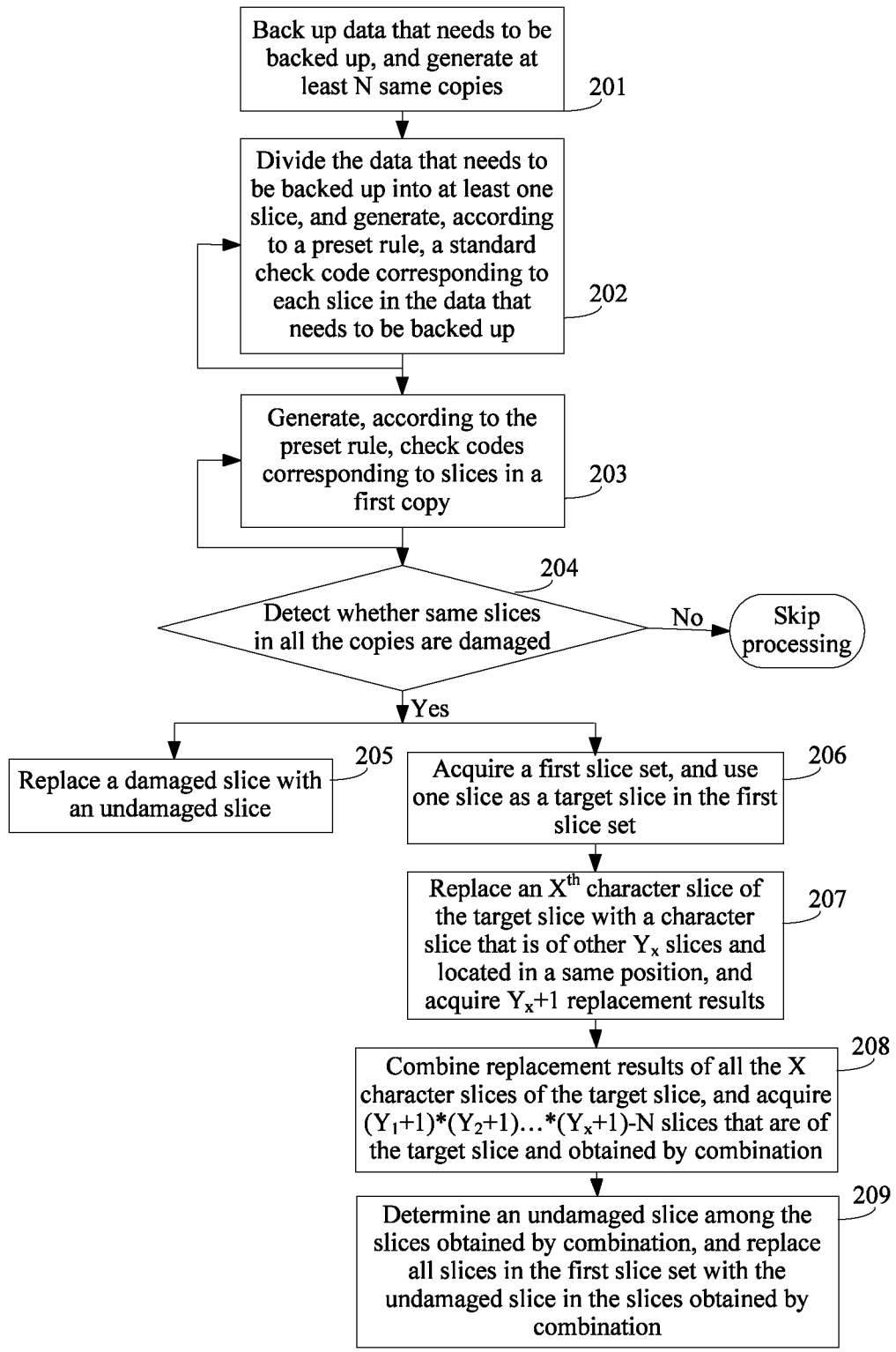
FIG. 2A is a flowchart of another method for recovering data according to an embodiment of the present invention.

In this embodiment, the method may further include a solution shown in FIG. 2A.

201. Back up data that needs to be backed up, and generate at least N same copies.

202. Divide the data that needs to be backed up into at least one segment, and generate, according to a preset rule, a standard check code corresponding to each segment in the data that needs to be backed up.

Each segment in the data that needs to be backed up includes part of content of the data that needs to be backed up, the number of segments in the data that needs to be backed up is the same as the number of segments in a copy, and the segments in the data that needs to be backed up have a same composition structure as the segments in the copy.

In this embodiment, after executing 201, a server may execute dividing on the data that needs to be backed up in a same dividing manner as a copy, so that the data that needs to be backed up is segmented into segments with the same composition structure and quantity as the segments in the copy. Because a copy document that is backed up is the same as an original document and dividing manners are also the same, a segment in the original document is the same as a segment in a same position in other copy documents, for example, as shown in FIG. 2C, a segment 1 in the original document is the same as a segment 1 in a copy document 1, a segment 1 in a copy document 2, and a segment 1 in a copy document 3.

In an actual application, data is finally stored in a hardware device in a form of a character string. In this embodiment, the server may compute, according to the preset rule, such as a Message Digest (MD5) Algorithm, a Cyclic Redundancy Check (CRC), or a Secure Hash Algorithm (SHA), a specific character string of data included in a segment, and obtain a corresponding check code. That is, the server may generate, according to the preset rule, a corresponding check code for each segment.

202 is repeated until the standard check code corresponding to each segment is acquired.

203. Generate, according to the preset rule, check codes corresponding to segments in a first copy.

The foregoing procedure is repeated until check codes corresponding to the segments in all the copies are generated.

It should be noted that, when data in a copy is undamaged, a segment in the copy is the same as a segment in the data that needs to be backed up, that is, a specific character string of data included in the segment in the copy is the same as a specific character string of data included in the segment in the data that needs to be backed up, and the standard check code generated by the server is also the same as a check code for the segment in the copy. For example, as shown in FIG. 2D, the segment 1 in the original document is the same as the segment 1 in the copy document 1, the segment 1 in the copy document 2 and the segment 1 in the copy document 3. When data in a copy is undamaged, the standard check code that is generated by the server according to the preset rule, such as an MD5 algorithm and that is for the segment 1 in the original document, is the same as a check code for the segment 1 in the copy document 1, a check code for the segment 1 in the copy document 2, and a check code for the segment 1 in the copy document 3.

204. Detect whether same segments in all the copies are damaged.

In this embodiment, 204 may include:

2041. Detect whether the check codes corresponding to the segments in the first copy are the same as the standard check code.

The standard check code is generated by the server using the preset rule in 202 according to the data that needs to be backed up.

In this embodiment, when data in a copy is damaged, a specific character string of data included in a segment in the copy may be different from a specific character string of data included in a segment in the data that needs to be backed up. For example, when data in a copy document is undamaged, a character string included in the segment 1 is 0011 and is the same as a character string included in the segment 1 in the original document, and a check code that is obtained after the server computes 0011 according to the MD5 algorithm and the standard check code are both FF (In the embodiment, FF is an example of the standard check code). When the data in the copy document is damaged, the character string included in the segment 1 becomes 1011 and is different from the character string 0011 included in the segment 1 in the original document, and a check code that is obtained after the server computes 1011 according to the MD5 algorithm is AF and is different from the standard check code FF.

If a check code corresponding to one segment in the first copy is the same as the standard check code, this segment in the first copy is undamaged.

In this embodiment, if a check code corresponding to one segment in one copy is the same as the standard check code, because the check code and the standard code are generated by the server according to the same preset rule, obviously, this segment in the copy is the same as the data that needs to be backed up, which indicates that this segment in the copy is undamaged.

If a check code corresponding to one segment in the first copy is different from the standard check code, this segment in the first copy is damaged.

2041 is repeatedly performed on all the copies until it is detected whether the segments in all the copies are damaged.

205. Replace a damaged segment with an undamaged segment if at least one of same segments in all the copies is undamaged.

Processing is skipped if no segment in all the copies is damaged.

Figure 2B:
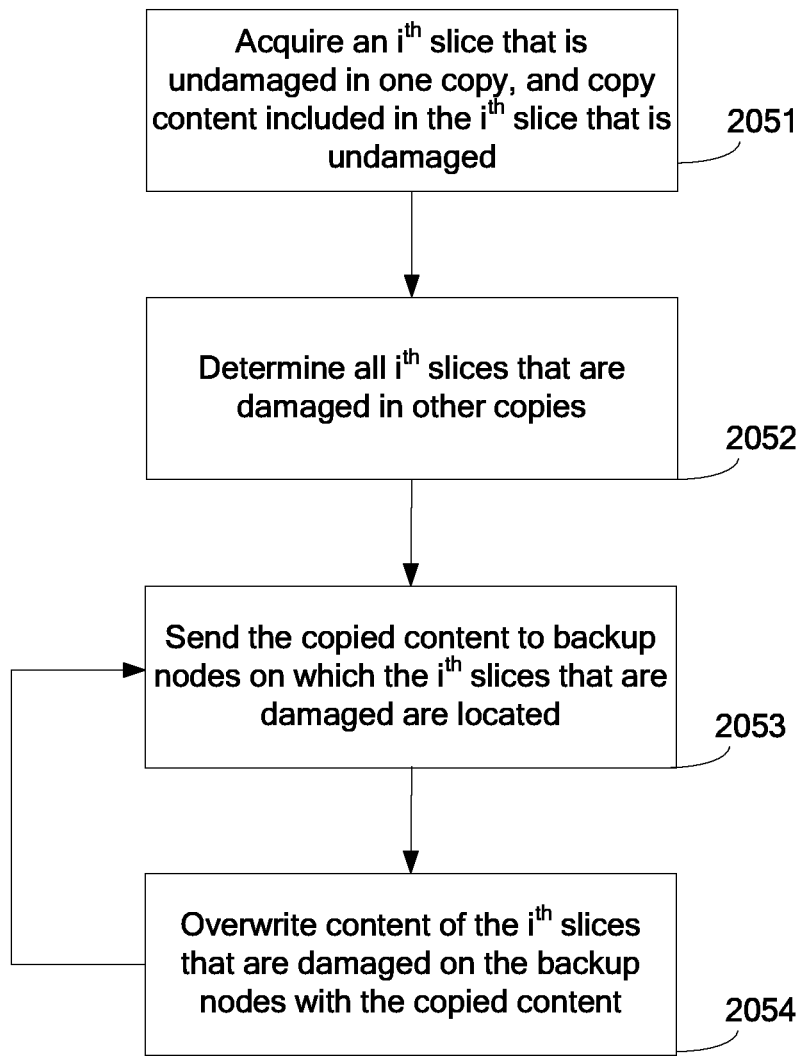
FIG. 2B is a flowchart of a specific implementation manner of another method for recovering data according to an embodiment of the present invention.
Figure 2C:
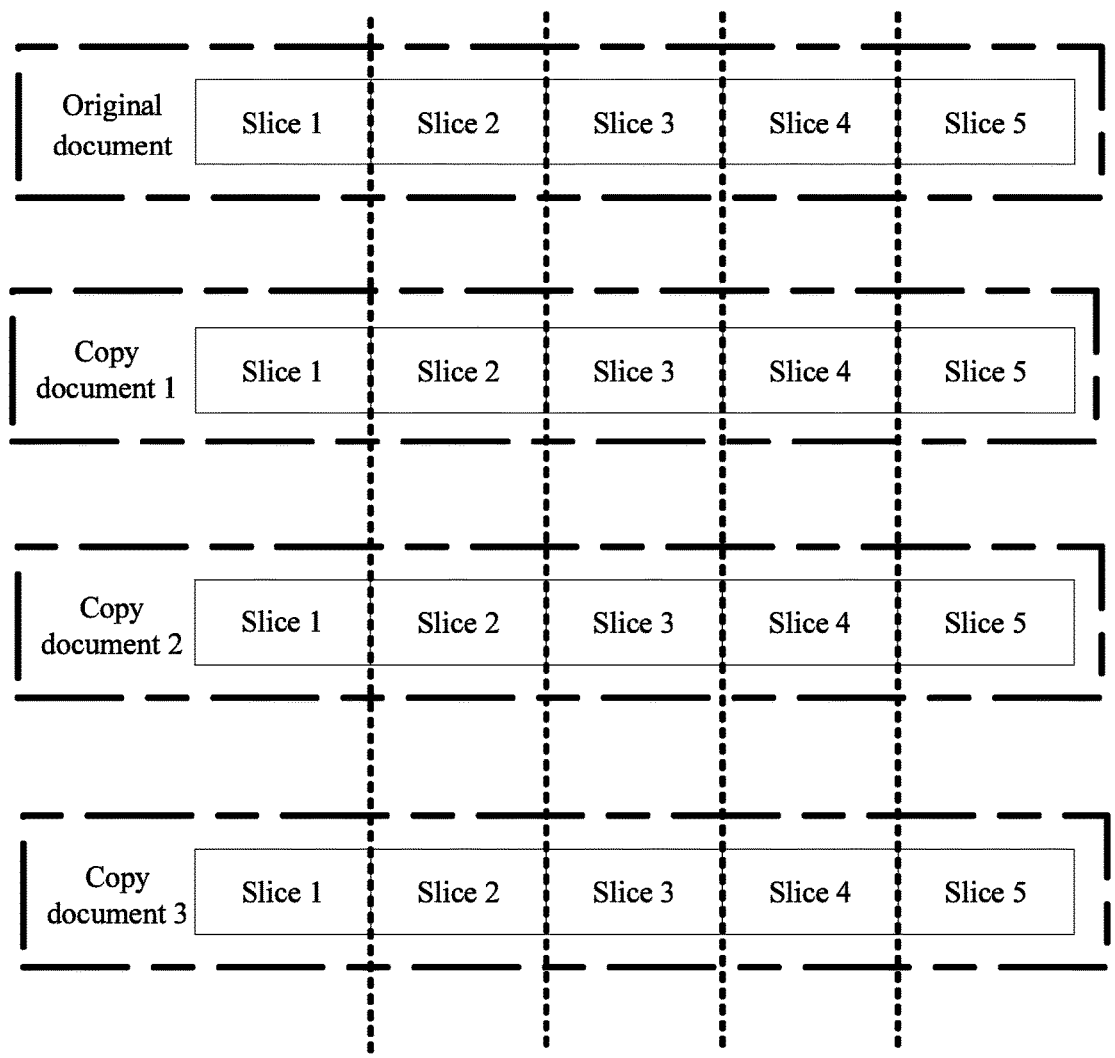
FIG. 2C is a schematic diagram of a specific example of a method for recovering data according to an embodiment of the present invention.
Figure 2D:
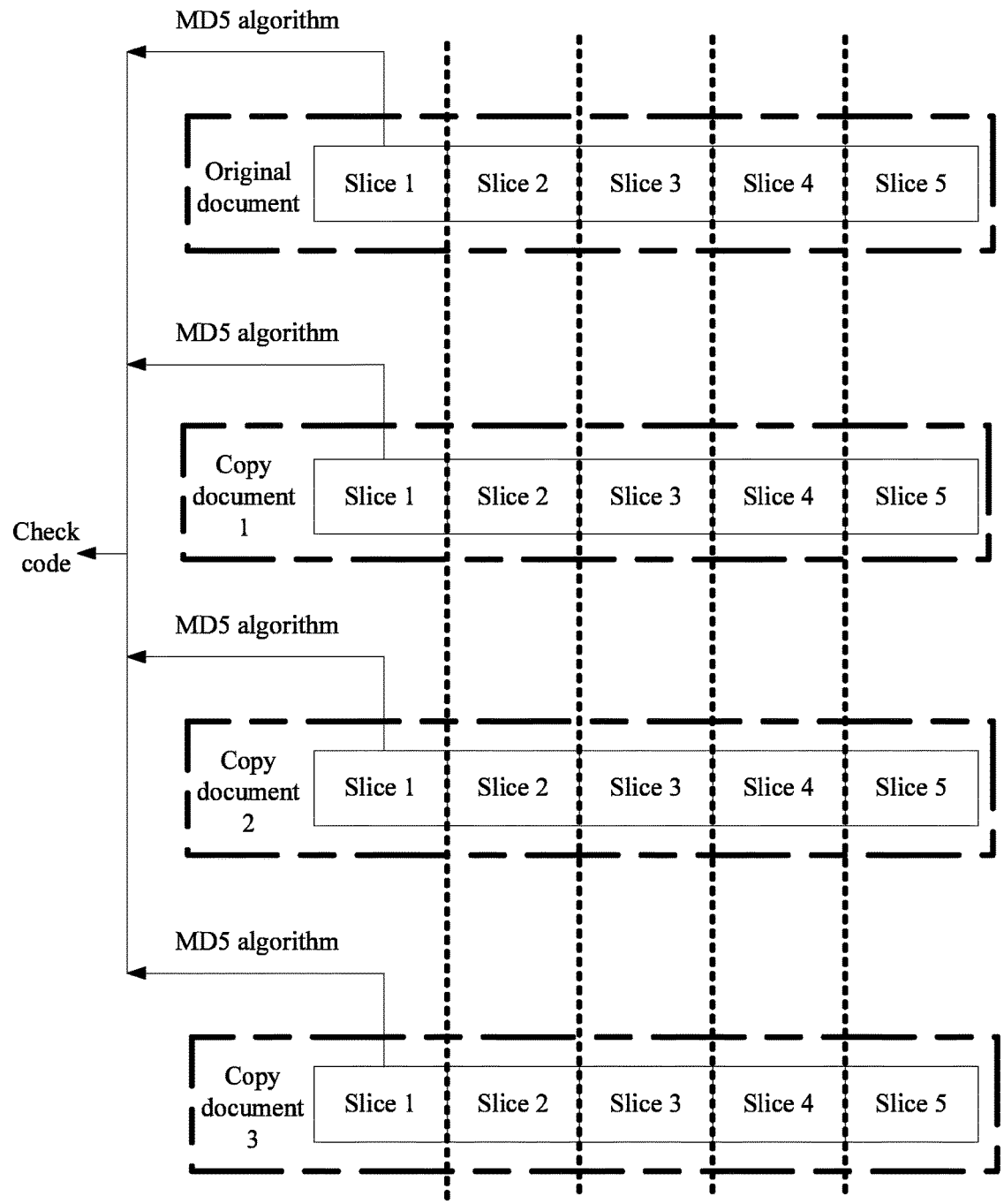
FIG. 2D is a schematic diagram of another specific example of a method for recovering data according to an embodiment of the present invention.

In this embodiment, as shown in FIG. 2B, 205 may include:

2051. Acquire an $i^{th}$ segment that is undamaged in one copy, and copy content included in the $i^{th}$ segment that is undamaged, where $1 \leq i \leq M$, and i is an integer.

For example, for the copy documents shown in FIG. 2C, if the segment 1 in the copy document 1 and the segment 1 in the copy document 2 are damaged and the segment 1 in the copy document 3 is undamaged, the server may copy the segment 1 in the copy document 3.

2052. Determine all $i^{th}$ segments that are damaged in other copies.

For example, for the copy documents shown in FIG. 2C, that the server determines all the segments 1 that are damaged, the segment 1 in the copy document 1 and the segment 1 in the copy document 2 are damaged.

2053. Send the copied content to backup nodes on which the $i^{th}$ segments that are damaged are located.

In this embodiment, the backup nodes may be devices that are well-known to a person skilled in the prior art and has a data storage function, such as a hard disk in a database or a terminal device on a cloud network.

Figure 2E:
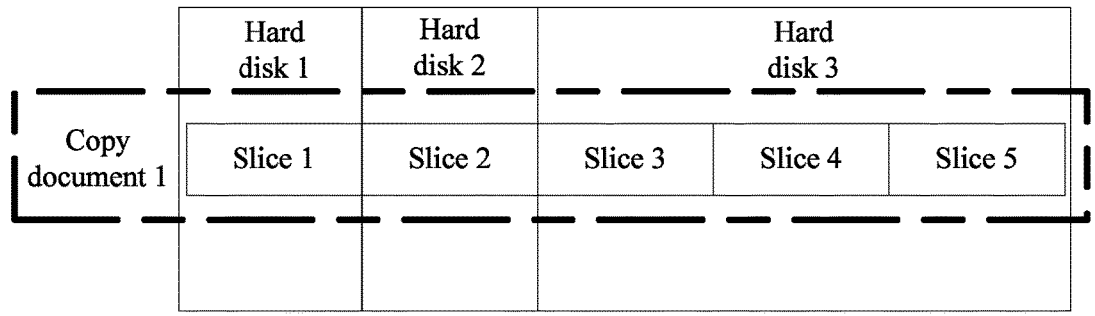
FIG. 2E is a schematic diagram of still another specific example of a method for recovering data according to an embodiment of the present invention.

It should be noted that, in this embodiment, segments in a same copy may be stored in different backup nodes, or may be stored in a same backup node. For example, as shown in FIG. 2E, backup nodes are hard disks in a database, the segment 1 in the copy document 1 may be stored in a hard disk 1, the segment 2 in the copy document 1 may be stored in a hard disk 2, and segments 3, 4 and 5 in the copy document 1 may be stored in a hard disk 3.

2054. Overwrite content of the $i^{th}$ segments that are damaged on the backup nodes with the copied content.

The process of 2053-2054 is repeated until content of all the $i^{th}$ segments that are damaged is overwritten with the copied content.

206. If the same segments in all the copies are all damaged, acquire a first segment set, and use one segment as a target segment in the first segment set.

The first segment set includes segments in one same position in all the copies; and X sub-segments of the target segment are different from sub-segments that are of other segments in the first segment set and located in same positions as the X sub-segments, X is an integer greater than or equal to 1, one sub-segment includes at least one binary character, and a manner of dividing each segment into sub-segments is the same, that is, in the first segment set, one sub-segment of one segment includes same content as a sub-segment that is of another segment in the first segment set and located in a same position as this sub-segment.

Figure 2F:
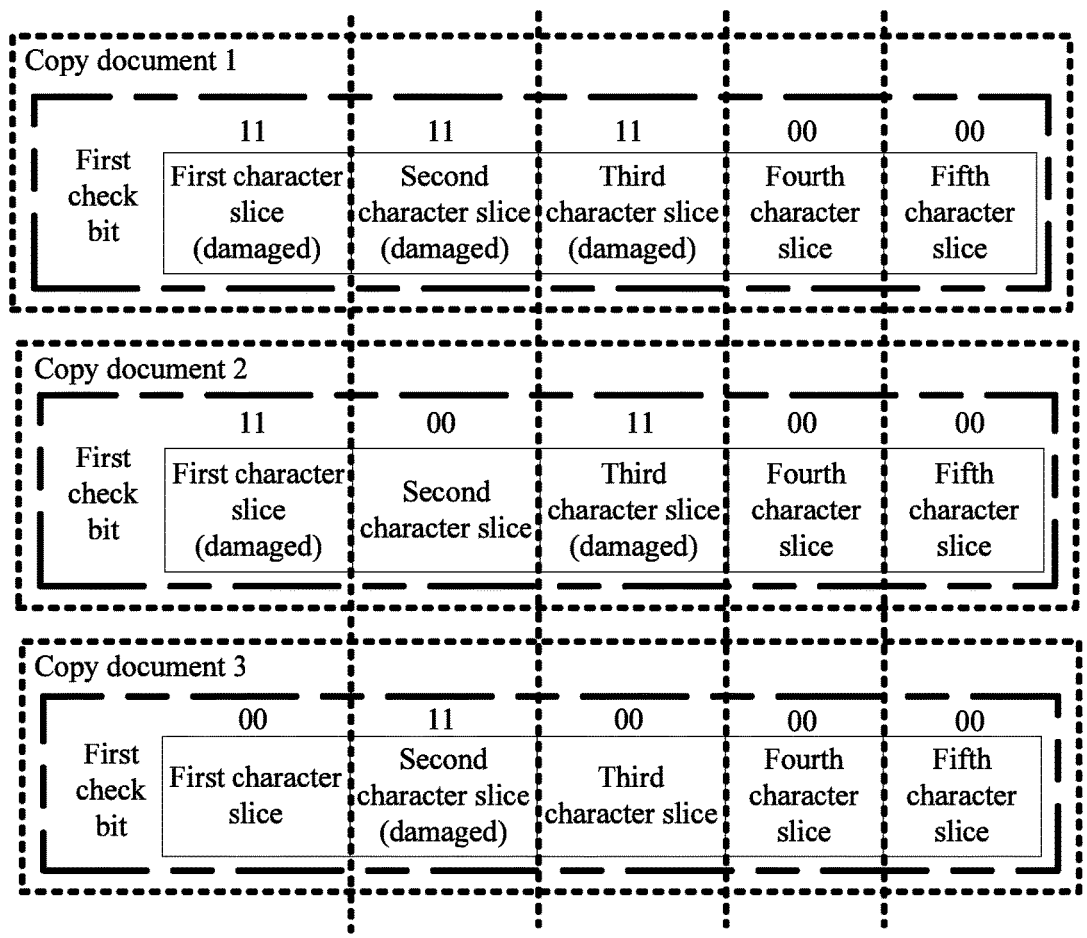
FIG. 2F is a schematic diagram of yet another specific example of a method for recovering data according to an embodiment of the present invention.

For example, as shown in FIG. 2F, the first segment in the copy document 1, the first segment in the copy document 2 and the first segment in the copy document 3 are all damaged. The server may further segment the first segment in each copy into five sub-segments using a commonly used technical means, each sub-segment includes two binary characters, specific content of the first segment in a correct copy document (or the original document) is 00 00 00 00 00. However, because the first segments in the copy documents 1, 2 and 3 are all damaged, specific content of the first segment in the copy document 1 is 11 11 11 00 00, specific content of the first segment in the copy document 2 is 11 00 11 00 00, and specific content of the first segment in the copy document 3 is 00 11 00 00 00. In the embodiment, the sub-segment is also named character slice. These two terms are interchangeable.

That is, the first sub-segment of the first segment in the copy document 1 is different from the first sub-segment of the first segment in the copy document 3, the second sub-segment of the first segment in the copy document 1 is different from the second sub-segment of the first segment in the copy document 2, and the third sub-segment of the first segment in the copy document 1 is different from the third sub-segment of the first segment in the copy document 3. Therefore, the server may determine that three sub-segments of the first segment in the copy document 1 are different from sub-segments that are of other segments and located in same positions, that is, X=3.

207. Replace an $X^{th}$ sub-segment of the target segment with a sub-segment that is of other $Y_x$ segments and located in a same position, and acquire $Y_x+1$ replacement results.

$Y_x$ represents the number of sub-segments that are of other segments, located in the same position and different from the $X^{th}$ sub-segment of the target segment, $Y_x$ is an integer, and $1 \leq Y_x \leq N$.

For example, as shown in FIG. 2F, for the first check bit in the first segment in the copy document 1, if $Y_1=1$, two replacement results, namely, 11 and 00, may be acquired; for the second sub check in the first segment in the copy document 1, if $Y_2=1$, two replacement results, namely, 11 or 00, may be acquired; for the third sub check in the first segment in the copy document 1, if $Y_3=3$, two replacement results, namely, 11 or 00, may be acquired.

208. Combine replacement results of all the X sub-segments of the target segment, and acquire $(Y_1+1)*(Y_2+1) \ldots *(Y_x+1)-N$ segments that are of the target segment and obtained by combination.

For example, as shown in FIG. 2F, for specific content of the first segment in the copy document 1, seven combinations may be acquired, and include:

```
00 11 11 00 00
11 00 11 00 00
11 11 00 00 00
00 11 00 00 00
11 00 00 00 00
00 00 11 00 00
00 00 00 00 00
```

209. Determine an undamaged segment among the segments obtained by combination, and replace all segments in the first segment set with the undamaged segment in the segments obtained by combination.

For example, as shown in FIG. 2F, for the seven combinations of the specific content of the first segment in the copy document 1, if 00 00 00 00 00 is the same as the specific content of the first segment in the correct copy document (or the original document), a segment 00 00 00 00 00 that is obtained by combination is the undamaged segment, and the server may replace a damaged segment with the undamaged segment.

Figure 2G:
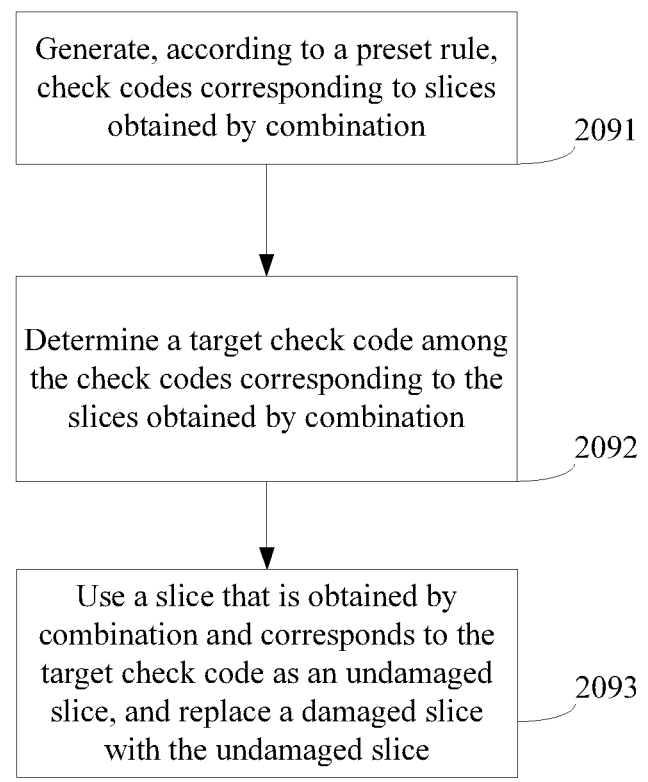
FIG. 2G is a flowchart of another specific implementation manner of another method for recovering data according to an embodiment of the present invention.

As shown in FIG. 2G, 209 may include:

2091. Generate, according to the preset rule, check codes corresponding to the segments obtained by combination.

In this embodiment, the server may generate check codes for the $(Y_1+1)*(Y_2+1) \ldots *(Y_x+1)-N$ segments obtained by combination according to the preset rule in 202.

2092. Determine a target check code among the check codes corresponding to the segments obtained by combination.

The target check code is a check code that is the same as a standard check code corresponding to the target segment, and in the data that needs to be backed up, a standard check code of a segment that is located in a same position as the target segment is the standard check code corresponding to the target segment.

For example, as shown in FIG. 2F, according to the preset rule in 202, the generated check code for 00 00 00 00 00 is the same as the standard check code for the first segment in the copy document 1, and the check code for 00 00 00 00 00 is the target check code.

2093. Use a segment that is obtained by combination and corresponds to the target check code as the undamaged segment, and replace a damaged segment with the undamaged segment.

For example, as shown in FIG. 2F, according to the preset rule in 202, the generated check code for 00 00 00 00 00 is the same as the standard check code for the first segment in the copy document 1, and the segment 00 00 00 00 00 that is obtained by combination is the undamaged segment.

According to the method for recovering data provided in this embodiment of the present invention, data in a copy can be divided into multiple data segments, check codes for the data segments are compared to detect whether the data segments are damaged, and when one data segment is damaged, the damaged data segment is recovered using another undamaged data segment, thereby ensuring correctness of the data segments and further ensuring correctness of the copy. In the solutions provided in the present invention, data that is backed up can still be recovered when damaged data exists in all copies, which prevents a problem in the prior art that the copies cannot be recovered and the data that is backed up is permanently damaged when all the copies are damaged, thereby improving security of the data that is backed up and reducing losses of a user.

Figure 3:
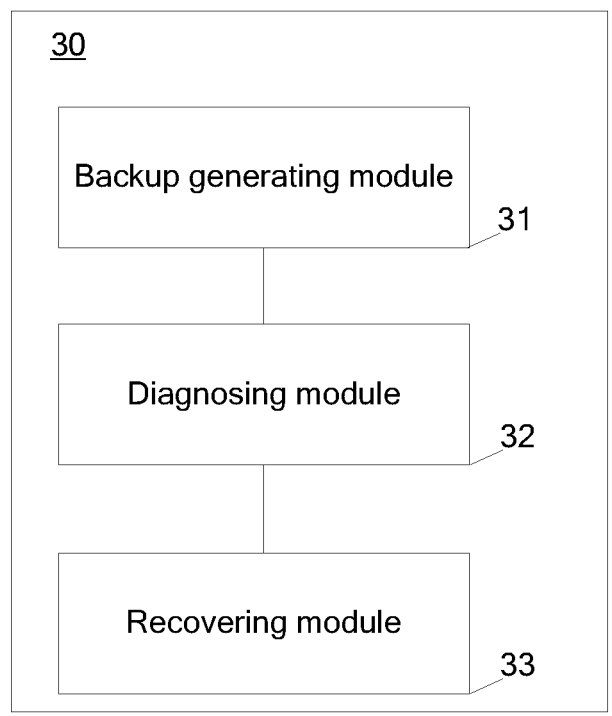
FIG. 3 is a schematic structural diagram of an apparatus for recovering data according to an embodiment of the present invention.

According to another aspect, an embodiment of the present invention provides an apparatus 30 for recovering data, as shown in FIG. 3, including a backup generating module 31, configured to back up data that needs to be backed up, and generate at least N same copies, where each copy is formed by at least M segments, each segment includes part of content of one copy, the number of segments forming each copy is the same, N is a positive integer greater than or equal to 2, M is a positive integer greater than or equal to 1, and a manner of dividing each copy into segments is the same, that is, when all the copies are undamaged, one segment in one copy includes same content as a segment that is in another copy and located in a same position as this segment; a diagnosing module 32, configured to detect whether segments in a same position in all the copies are damaged; and a recovering module 33, configured to replace a damaged segment with an undamaged segment if at least one of same segments in all the copies is undamaged.

According to the apparatus for recovering data provided in this embodiment of the present invention, data in a copy can be divided into multiple data segments, check codes for the data segments are compared to detect whether the data segments are damaged, and when one data segment is damaged, the damaged data segment is recovered using another undamaged data segment, thereby ensuring correctness of the data segments and further ensuring correctness of the copy. In the solutions provided in the present invention, data that is backed up can still be recovered when damaged data exists in all copies, which prevents a problem in the prior art that the copies cannot be recovered and the data that is backed up is permanently damaged when all the copies are damaged, thereby improving security of the data that is backed up and reducing losses of a user.

Figure 4A:
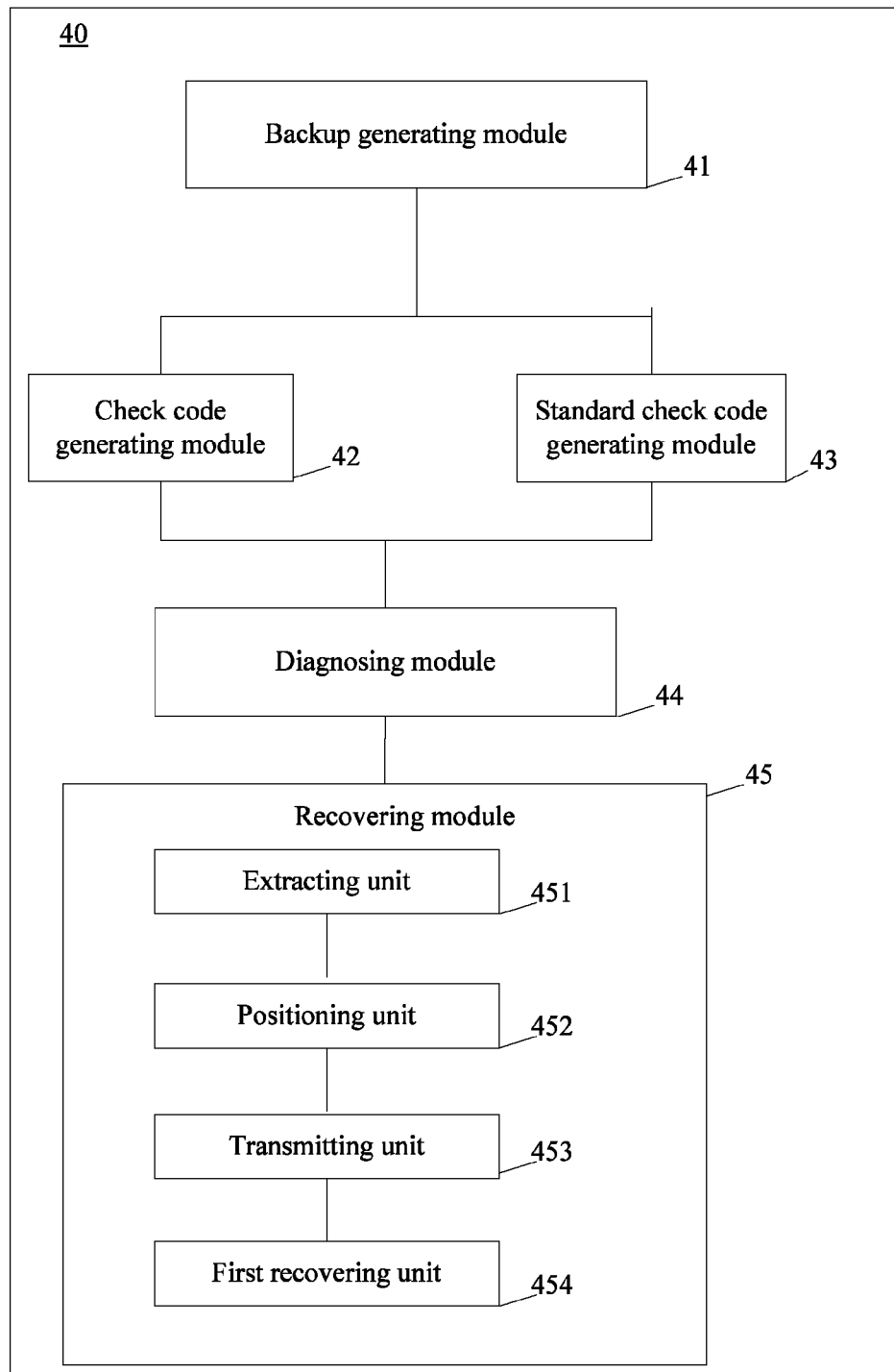
FIG. 4A is a schematic structural diagram of another apparatus for recovering data according to an embodiment of the present invention.

Further, an embodiment of the present invention provides another apparatus 40 for recovering data, as shown in FIG. 4A, including a backup generating module 41, configured to back up data that needs to be backed up, and generate at least N same copies; a check code generating module 42, configured to generate, according to a preset rule, check codes corresponding to segments in a first copy; a standard check code generating module 43, configured to divide the data that needs to be backed up into at least one segment, and generate, according to the preset rule, a standard check code corresponding to each segment in the data that needs to be backed up, where each segment in the data that needs to be backed up includes part of content of the data that needs to be backed up, and a manner of dividing the data that needs to be backed up into segments is the same as a manner of dividing each copy into segments, that is, when all the copies are undamaged, one segment in the data that needs to be backed up includes same content as a segment that is in any copy and located in a same position as this segment; a diagnosing module 44, configured to detect whether segments in a same position in all the copies are damaged, where the diagnosing module 44 is further configured to detect whether the check codes corresponding to the segments in the first copy are the same as the standard check code, where if a check code corresponding to one segment in the first copy is the same as the standard check code, this segment in the first copy is undamaged, and if a check code corresponding to one segment in the first copy is different from the standard check code, this segment in the first copy is damaged; and repeat the foregoing procedure until it is detected whether the segments in all copies are damaged; and the diagnosing module 44 is further configured to repeat the foregoing procedure for other N−1 copies until it is detected whether the segments in all the copies are damaged; and a recovering module 45, configured to replace a damaged segment with an undamaged segment if at least one of same segments in all the copies is undamaged.

Further, optionally, the recovering module 45 may include an extracting unit 451, configured to acquire an $i^{th}$ segment that is undamaged in one copy, and copy content included in the $i^{th}$ segment that is undamaged, where $1 \leq i \leq M$, and i is an integer; a positioning unit 452, configured to determine all $i^{th}$ segments that are damaged in other copies; a transmitting unit 453, configured to send the copied content to backup nodes on which the $i^{th}$ segments that are damaged are located; and a first recovering unit 454, configured to overwrite content of the $i^{th}$ segments that are damaged on the backup nodes with the copied content.

The recovering module 45 may repeatedly run the extracting unit 451, the positioning unit 452, the transmitting unit 453 and the first recovering unit 454 until content of all the $i^{th}$ segments that are damaged is overwritten with the copied content.

Figure 4B:
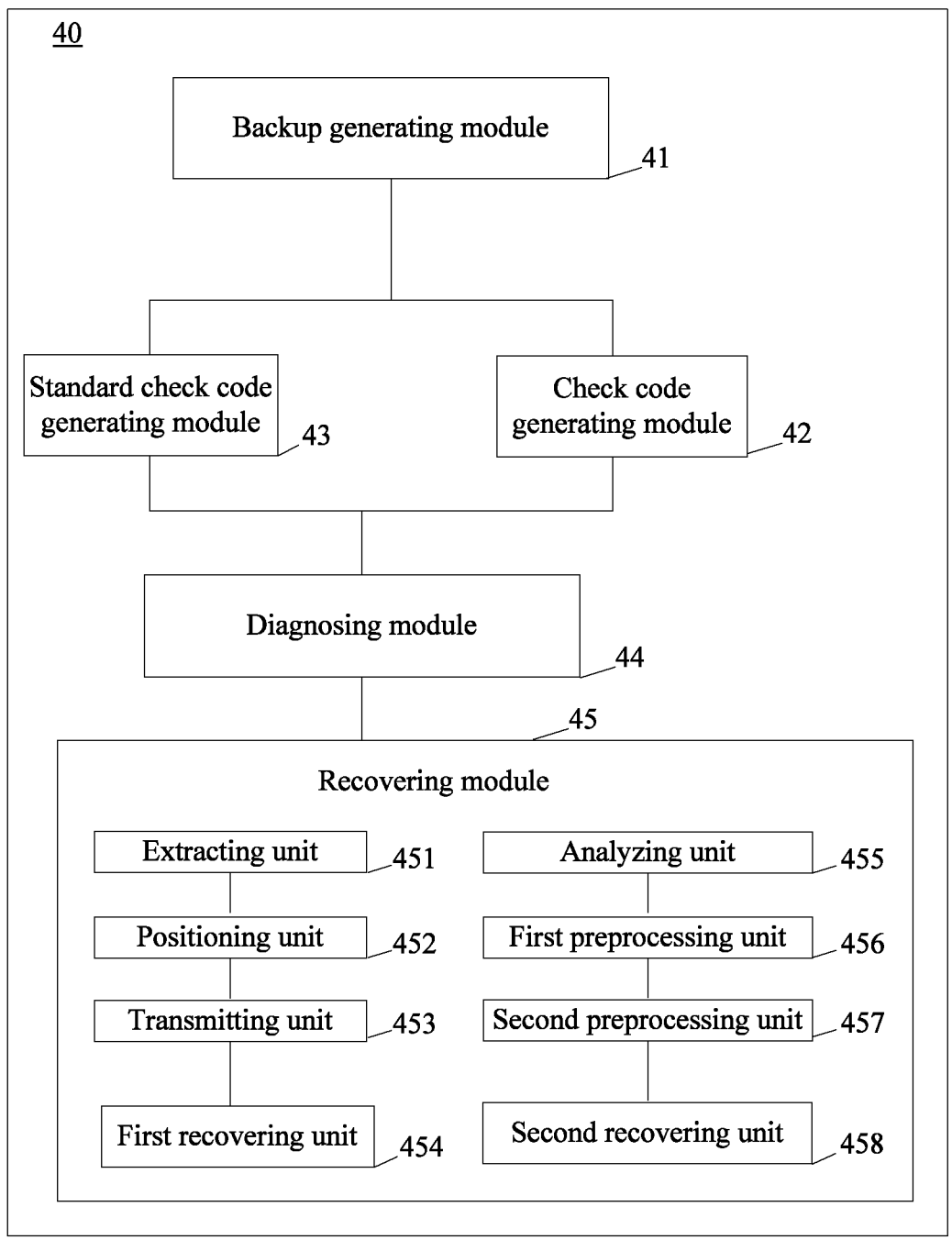
FIG. 4B is another schematic structural diagram of another apparatus for recovering data according to an embodiment of the present invention.

As shown in FIG. 4B, the recovering module 45 further includes an analyzing unit 455, configured to acquire a first segment set, where the first segment set includes segments in one same position in all the copies, and use one segment as a target segment in the first segment set, where X sub-segments of the target segment are different from sub-segments that are of other segments in the first segment set and located in same positions as the X sub-segments, X is an integer greater than or equal to 1, one sub-segment includes at least one binary character, and a manner of dividing each segment into sub-segments is the same, that is, in the first segment set, one sub-segment of one segment includes same content as a sub-segment that is of another segment in the first segment set and located in a same position as this sub-segment; a first preprocessing unit 456, configured to replace an $X^{th}$ sub-segment of the target segment with a sub-segment that is of other $Y_x$ segments and located in a same position, and acquire $Y_x+1$ replacement results, where $Y_x$ represents the number of sub-segments that are of other segments, located in the same position and different from the $X^{th}$ sub-segment of the target segment, $Y_x$ is an integer, and $1 \leq Y_x \leq N$; a second preprocessing unit 457, configured to combine replacement results of all the X sub-segments of the target segment and acquire $(Y_1+1)*(Y_2+1) \ldots *(Y_x+1)-N$ segments that are of the target segment and obtained by combination; and a second recovering unit 458, configured to determine an undamaged segment among the segments obtained by combination, and replace all segments in the first segment set with the undamaged segment in the segments obtained by combination.

The check code generating module 42 is further configured to generate, according to the preset rule, check codes corresponding to the segments obtained by combination.

The diagnosing module 44 is configured to determine a target check code among the check codes corresponding to the segments obtained by combination, and use a segment that is obtained by combination and corresponds to the target check code as the undamaged segment, where the target check code is a check code that is the same as a standard check code corresponding to the target segment, and in the data that needs to be backed up, a standard check code for a segment that is located in a same position as the target segment is the standard check code corresponding to the target segment.

According to the apparatus for recovering data provided in this embodiment of the present invention, data in a copy can be divided into multiple data segments, check codes for the data segments are compared to detect whether the data segments are damaged, and when one data segment is damaged, the damaged data segment is recovered using another undamaged data segment, thereby ensuring correctness of the data segments and further ensuring correctness of the copy. In the solutions provided in the present invention, data that is backed up can still be recovered when damaged data exists in all copies, which avoids a problem in the prior art that the copies cannot be recovered and the data that is backed up is permanently damaged when all the copies are damaged, thereby improving security of the data that is backed up and reducing losses of a user.

Figure 5:
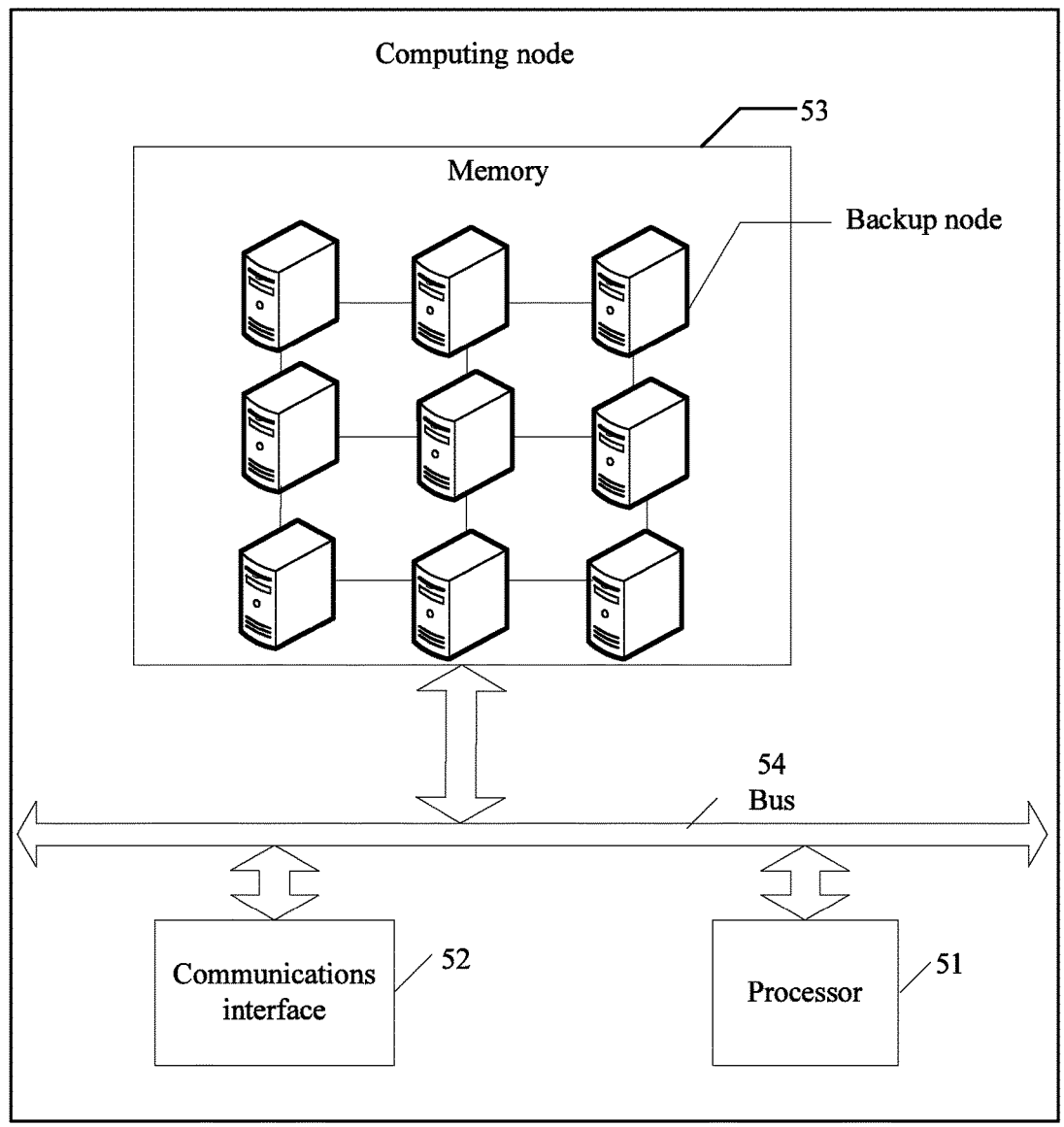
FIG. 5 is a schematic structural diagram of a computing node for recovering data according to an embodiment of the present invention.

According to still another aspect, an embodiment of the present invention provides a computing code for recovering data, as shown in FIG. 5, including a processor 51, a communication interface 52, a memory 53, and a bus 54, where the processor 51, the communication interface 52 and the memory 53 implement mutual communication using the bus 54.

The processor 51 is configured to acquire, through the communication interface 52, a data backup that needs to be backed up, back up data that needs to be backed up, generate at least N same copies, and store the at least N same copies in the memory 53, where each copy is formed by at least M segments, each segment includes part of content of one copy, the number of segments forming each copy is the same, N is a positive integer greater than or equal to 2, M is a positive integer greater than or equal to 1, and a manner of dividing each copy into segments is the same, that is, when all the copies are undamaged, one segment in one copy includes same content as a segment that is in another copy and located in a same position as this segment.

The processor 51 is further configured to detect whether segments in a same position in all the copies are damaged.

The processor 51 is further configured to, if at least one of same segments in all the copies is undamaged, acquire the undamaged segment from the memory 53, and replace a damaged segment in the memory 53 with the undamaged segment.

Optionally, the processor 51 is further configured to divide the data that needs to be backed up into at least one segment, generate, according to a preset rule, a standard check code corresponding to each segment in the data that needs to be backed up, and store the generated standard check code in the memory 53, where each segment in the data that needs to be backed up includes part of content of the data that needs to be backed up, and a manner of dividing the data that needs to be backed up into segments is the same as the manner of dividing each copy into segments, that is, when all the copies are undamaged, one segment in the data that needs to be backed up includes same content as a segment that is in any copy and located in a same position as this segment.

In parallel, optionally, the processor 51 is further configured to generate, according to the preset rule, check codes corresponding to segments in a first copy; detect whether the check codes corresponding to the segments in the first copy are the same as the standard check code stored in the memory 53, where if a check code corresponding to one segment in the first copy is the same as the standard check code, this segment in the first copy is undamaged, and if a check code corresponding to one segment in the first copy is different from the standard check code, this segment in the first copy is damaged; and repeat the foregoing procedure until it is detected whether the segments in all the copies are damaged.

Further, optionally, the memory 53 is formed by at least one backup node, and the processor 51 is further configured to acquire an $i^{th}$ segment that is undamaged in one copy, and copy content included in the $i^{th}$ segment that is undamaged, where $1 \leq i \leq M$, and i is an integer; determine all $i^{th}$ segments that are damaged in other copies; send, through the communication interface 52, the copied content to backup nodes on which the $i^{th}$ segments that are damaged are located; and overwrite content of the $i^{th}$ segments that are damaged on the backup nodes with the copied content.

Further, optionally, the processor 51 is further configured to acquire a first segment set, if the same segments in all the copies are all damaged, where the first segment set includes segments in one same position in all the copies; use one segment as a target segment in the first segment set, where X sub-segments of the target segment are different from sub-segments that are of other segments in the first segment set and located in same positions as the X sub-segments, X is an integer greater than or equal to 1, one sub-segment includes at least one binary character, and a manner of dividing each segment into sub-segments is the same, that is, in the first segment set, one sub-segment of one segment includes same content as a sub-segment that is of another segment in the first segment set and located in a same position as this sub-segment; replace an $X^{th}$ sub-segment of the target segment with a sub-segment that is of other $Y_x$ segments and located in a same position, and acquire $Y_x+1$ replacement results, where $Y_x$ represents the number of sub-segments that are of other segments, located in the same position and different from the $X^{th}$ sub-segment of the target segment, $Y_x$ is an integer, and $1 \leq Y_x \leq N$; and then, combine replacement results of all the X sub-segments of the target segment, and acquire $(Y_1+1)*(Y_2+1) \ldots *(Y_x+1)-N$ segments that are of the target segment and obtained by combination; and finally, determine an undamaged segment among the segments obtained by combination, and replace all segments in the first segment set with the undamaged segment in the segments obtained by combination.

Further, optionally, the processor 51 is further configured to generate, according to the preset rule, check codes corresponding to the segments obtained by combination, and store, in the memory 53, the check code corresponding to the segments obtained by combination; determine a target check code among the check codes corresponding to the segments obtained by combination, where the target check code is a check code that is the same as a standard check code corresponding to the target segment, and in the data that needs to be backed up, a standard check code for a segment that is located in a same position as the target segment is the standard check code corresponding to the target segment; and use a segment that is obtained by combination and corresponds to the target check code as the undamaged segment.

According to the apparatus for recovering data provided in this embodiment of the present invention, data in a copy can be divided into multiple data segments, check codes for the data segments are compared to detect whether the data segments are damaged, and when one data segment is damaged, the damaged data segment is recovered using another undamaged data segment, thereby ensuring correctness of the data segments and further ensuring correctness of the copy. In the solutions provided in the present invention, data that is backed up can still be recovered when damaged data exists in all copies, which prevents a problem in the prior art that the copies cannot be recovered and the data that is backed up is permanently damaged when all the copies are damaged, thereby improving security of the data that is backed up and reducing losses of a user.

Further, an embodiment of the present invention provides a computer program product for recovering data, including a computer-readable storage medium that stores program code, where an instruction included in the program code is used for backing up data that needs to be backed up, and generating at least N same copies, where each copy is formed by at least M segments, each segment includes part of content of one copy, the number of segments forming each copy is the same, N is a positive integer greater than or equal to 2, M is a positive integer greater than or equal to 1, and a manner of dividing each copy into segments is the same, that is, when all the copies are undamaged, one segment in one copy includes same content as a segment that is in another copy and located in a same position as this segment; and executing the following procedure for each segment: detecting whether segments in a same position in all the copies are damaged; and replacing a damaged segment with an undamaged segment if at least one of same segments in all the copies is undamaged.

According to the computer program product for recovering data provided in this embodiment of the present invention, data in a copy can be divided into multiple data segments, check codes for the data segments are compared to detect whether the data segments are damaged, and when one data segment is damaged, the damaged data segment is recovered using another undamaged data segment, thereby ensuring correctness of the data segments and further ensuring correctness of the copy. In the solutions provided in the present invention, data that is backed up can still be recovered when damaged data exists in all copies, which prevents a problem in the prior art that the copies cannot be recovered and the data that is backed up is permanently damaged when all the copies are damaged, thereby improving security of the data that is backed up and reducing losses of a user.

The embodiments in this specification are described in a progressive manner, for same or similar parts in the embodiments, reference may be made to these embodiments, and each embodiment focuses on a difference from other embodiments. Especially, a device embodiment is basically similar to a method embodiment, and therefore is described briefly; for related parts, reference may be made to partial descriptions in the method embodiment.

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The foregoing storage medium may comprise a magnetic disk, an optical disc, a read-only memory (ROM), or a random access memory (RAM).

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method of data recovery performed by a server in a data storage system including a first storage device and a second storage device, each of the first storage device and the second storage device storing a copy of a segment, the method comprising:
   retrieving a first copy of data and a second copy of data from the first storage device and the second storage device, wherein the first copy of data is stored in the first storage device, wherein the second copy of data is stored in the second storage device, wherein a partition of the segment includes a first partition and a second partition, wherein the first copy of data includes a first set of sub-segments separately corresponding to the first partition and the second partition, and wherein the second copy of data includes a second set of sub-segments separately corresponding to the first partition and the second partition;
   combining a first sub-segment corresponding to the first partition and a second sub-segment corresponding to the second partition to generate a target segment, wherein the first sub-segment is selected from sub-segments corresponding to the first partition in the first set and the second set, and wherein the second sub-segment is selected from sub-segments corresponding to the second partition in the first set and the second set, wherein the target segment has a check code identical to a standard check code of the segment; and
   replacing the first copy of data in the first storage device and the second copy of data in the second storage device respectively with the target segment.

2. The method according to claim 1, wherein, before retrieving, the method further comprises:
   calculating a check code for each of the first copy of data and the second copy of data; and
   determining that the check code for each of the first copy of data and the second copy of data is not identical to the pre-stored standard check code.

3. The method according to claim 1, wherein the first copy of data stored in the first storage device is sent by the server, and wherein the second copy of data stored in the second storage device is sent by the server.

4. A data storage system for data recovery comprising:
a first storage device and a second storage device, each of the first storage device and the second storage device storing a copy of a segment; and
a server in communication with the first storage device and the second storage device and configured to:
retrieve a first copy of data and a second copy of data from a first storage device and a second storage device, wherein the first copy of data is stored in the first storage device, wherein the second copy of data is stored in the second storage device, wherein a partition of the segment includes a first partition and a second partition, wherein the first copy of data includes a first set of sub-segments separately corresponding to the first partition and the second partition, and wherein the second copy of data includes a second set of sub-segments separately corresponding to the first partition and the second partition;
combine a first sub-segment corresponding to the first partition and a second sub-segment corresponding to the second partition to generate a target segment, wherein the first sub-segment is selected from sub-segments corresponding to the first partition in the first set and the second set, and wherein the second sub-segment is selected from sub-segments corresponding to the second partition in the first set and the second set, wherein the target segment has a check code identical to a standard check code of the segment; and
replace the first copy of data in the first storage device and the second copy of data in the second storage device respectively with the target segment.

5. The data storage system according to claim 4, wherein the server is further configured to:
calculate a check code for each of the first copy of data and the second copy of data; and
determine that the check code for each of the first copy of data and the second copy of data is not identical to the pre-stored standard check code.

6. The data storage system according to claim 4, wherein the first copy of data stored in the first storage device is sent by the server, and wherein the second copy of data stored in the second storage device is sent by the server.

7. A server for data recovery comprising:
a communication interface for communicating with a first storage device and a second storage device, each of the first storage device and the second storage storing a copy of a segment; and
a processor coupled to the communication interface and configured to:
retrieve a first copy of data and a second copy of data from a first storage device and a second storage device, wherein the first copy of data is stored in the first storage device, wherein the second copy of data is stored in the second storage device, wherein a partition of the segment includes a first partition and a second partition, wherein the first copy of data includes a first set of sub-segments separately corresponding to the first partition and the second partition, and wherein the second copy of data includes a second set of sub-segments separately corresponding to the first partition and the second partition;
combine a first sub-segment corresponding to the first partition and a second sub-segment corresponding to the second partition to generate a target segment, wherein the first sub-segments is selected from sub-segments corresponding to the first partition in the first set and the second set, and wherein the second sub-segment is selected from sub-segments corresponding to the second partition in the first set and the second set, wherein the target segment having a check code identical to a standard check code of the segment; and
replace the first copy of data in the first storage device and the second copy of data in the second storage device respectively with the target segment.

8. The server according to claim 7, wherein the server is further configured to:
calculate a check code for each of the first copy of data and the second copy of data; and
determine that the check code for each of the first copy of data and the second copy of data is not identical to the pre-stored standard check code.

9. The server according to claim 7, wherein the first copy of data stored in the first storage device is sent by the server, and wherein the second copy of data stored in the second storage device is sent by the server.

* * * * *

UNITED STATES PATENT AND TRADEMARK OFFICE
CERTIFICATE OF CORRECTION

| | |
|---|---|
| PATENT NO. | : 9,983,941 B2 |
| APPLICATION NO. | : 14/639657 |
| DATED | : May 29, 2018 |
| INVENTOR(S) | : Feng Zhang and Fengtao Teng |

It is certified that error appears in the above-identified patent and that said Letters Patent is hereby corrected as shown below:

In the Claims

Column 20; Line 4; Claim 7 should read:
first storage device and the second storage device storing a Column 20; Line 25, Claim 7 should read:
wherein the first sub-segment is selected from sub- Signed and Sealed this
Seventeenth Day of July, 2018

Andrei Iancu
*Director of the United States Patent and Trademark Office*